United States Patent [19]

Dantlgraber

[11] Patent Number: 4,930,311
[45] Date of Patent: Jun. 5, 1990

[54] EXHAUST AND INLET LINE BRAKE VALVES FOR HYDROSTATIC MOTOR

[75] Inventor: Jörg Dantlgraber, Sackenbach, Fed. Rep. of Germany

[73] Assignee: Mannesmann Rexroth GmbH, Lohr/Main, Fed. Rep. of Germany

[21] Appl. No.: 235,009

[22] Filed: Aug. 22, 1988

[30] Foreign Application Priority Data

Aug. 24, 1987 [DE] Fed. Rep. of Germany ....... 3728206

[51] Int. Cl.$^5$ ...................... F16H 39/44; B60K 41/16; F04B 1/08
[52] U.S. Cl. ........................................ 60/406; 60/448; 60/460; 60/466
[58] Field of Search ................. 60/403, 406, 448, 450, 60/460, 466

[56] References Cited

U.S. PATENT DOCUMENTS

| | | | |
|---|---|---|---|
| 3,246,471 | 4/1966 | Goodale | 60/403 |
| 3,872,671 | 3/1975 | Verlinde | 60/460 |
| 3,943,714 | 3/1976 | Reinker | 60/406 X |
| 4,187,681 | 2/1980 | Johnson . | |
| 4,381,702 | 5/1983 | Myers | 60/403 X |
| 4,531,367 | 7/1985 | Backe et al. | 60/448 X |

FOREIGN PATENT DOCUMENTS

| | | |
|---|---|---|
| 2622885 | 12/1982 | Fed. Rep. of Germany . |
| 3330367 | 3/1985 | Fed. Rep. of Germany . |
| 936528 | 9/1963 | United Kingdom ................. 60/460 |

OTHER PUBLICATIONS

DE-Z: Der Konstrukteur 3, 1984.
DE-Z: Fluid, Apr. 185, S.68–70.
DE-Z: Tagungsunterlage v. 10.11.1983, Mannesman Rexroth.

Primary Examiner—Robert E. Garrett
Assistant Examiner—George Kapsalas
Attorney, Agent, or Firm—Harness, Dickey & Pierce

[57] ABSTRACT

The invention relates to a safety arrangement for a controlled drive which is connected to a conduit with impressed pressure. When the safety arrangement responds the machine is separated via shutoff valves from the inlet and outlet and a via a switchover valve the pivot angle of the machine is set to the maximum value so that the largest possible braking torque can be automatically set.

13 Claims, 1 Drawing Sheet

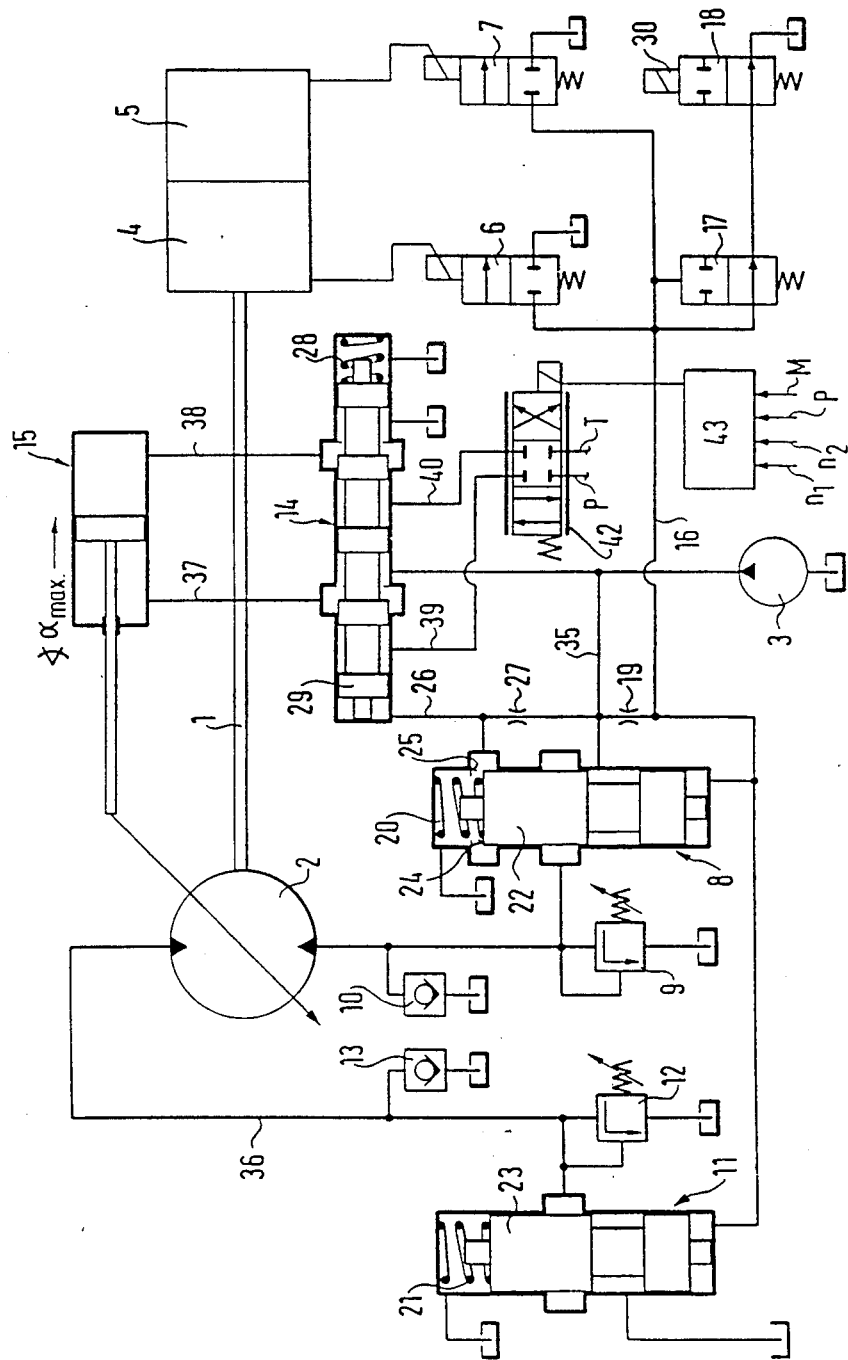

EXHAUST AND INLET LINE BRAKE VALVES FOR HYDROSTATIC MOTOR

BACKGROUND OF THE INVENTION

The invention relates to a safety arrangement for a hydrostatic machine connected to a pressure network with impressed pressure.

Secondarily controlled drive systems according to the preamble are known (DE-OS 3,441,185). The speed regulation is by means of a controller to which a plurality of input quantities are supplied as electrical signals, in particular the desired value for the speed and the actual value thereof picked up at a tachogenerator. With the output signal of the controller a proportional valve is driven which controls the fluid paths between a fluid source and a tank and the adjustment means of the hydrostatic machine. A pivot angle is thus set which corresponds to a predetermined absorption volume of the machine. A certain speed of rotation then arises depending on the magnitude of the load to be driven.

In such secondarily controlled drives there is a danger that on failure of a component of the electronic control means or on breakage of a cable the adjustment means for the pivot angle of the machine is so set that the drive motor undergoes maximum acceleration and assumes an inadmissibly high speed of rotation. Thus, speed changes of zero to 10000 rpm can occur within 100 ms.

To avoid this, for safety reasons multiply redundant electronic safety circuits are necessary which however still do not ensure absolute safety.

The invention is therefore based on the problem of providing for a secondarily controlled hydrostatic machine a mechanical-hydraulic safety circuit which reliably detects an inadmissible increase in the speed of rotation and prevents inadmissibly high speeds.

SUMMARY OF THE INVENTION

This problem is solved by the invention. Said problem is solved according to the invention by the features in the characterizing clause of claim 1.

The invention results in a very simple and reliable construction of the safety arrangement. In the supply line between the pressure network and the drive machine the shutoff valve is provided which is switched over to the shutoff position in dependence upon a speed condition of the drive machine such as the speed and/or acceleration.

Further advantageous developments of the invention are characterized in the subsidiary claims. Thus, the shutoff valve is held hydraulically by a control pressure in the open position. If an angular acceleration of the hydromotor takes place which is higher than admissible for the control implemented, or if the maximum speed of rotation is exceeded because for example a fault occurs in the electronic control means, a valve connected to the line carrying the control pressure is switched over so that the control pressure breaks down the shutoff valve moves into the shutoff position.

In a further development of the invention in the outlet of the drive motor as well a shutoff valve is provided so that the motor is shut off both with respect to the high-pressure line and with respect to the low-pressure line.

Furthermore, another valve is provided via which on switch-over of the shutoff valves to the shutoff position the adjustment means is connected to the fluid source to move the actuator in the direction of the maximum pivot angle. This makes it possible for the motor to generate a maximum restraining moment. The motor thus acts as brake for example to hold a suspended load in suspension. It is further possible according to the invention to reduce the speed of the motor with a selectable braking torque to zero speed.

For the control pressure a self-holding circuit is further provided so that the system can be put in operation again only after the fault has been eliminated. Until this is done no control pressure can be built up again.

BRIEF DESCRIPTION OF THE DRAWING

An example of embodiment of the invention will be explained hereinafter in detail with the aid of the drawing in which a safety arrangement for a secondarily controlled drive is shown schematically.

DETAILED DESCRIPTION OF THE PREFERRED EMBODIMENT

A pickup 4 for the angular acceleration of the shaft 1 and a pickup 5 for the speed of rotation of the shaft 1 are fixedly coupled to said shaft 1 of an adjustable hydrostatic motor 2 which is fed by a constant pressure source 3, i.e. a pump driven by a drive not illustrated.

If specific limit values for the speed and/or rotational acceleration are exceeded an electrical signal is generated with which the valves 6 and 7 are switched over. A control pressure line 16 is selectively shut off or connected to a tank T, i.e. relieved of pressure, by the valves 6 and 7.

The high-pressure connection of the machine 2 is connected to the constant pressure source 3 via an HP line 35 in which a shutoff valve 8, a pressure-limiting valve 9 and an after-suction valve 10 is arranged. A shutoff valve 11, a pressure-limiting valve 12 and an after-suction valve 13 are disposed in the LP line 36 for connecting the machine 2 to an outlet or tank.

The pivot angle adjustment of the machine 2 is by means of an actuator 15 which is connected via fluid paths 37, 38 and 39, 40 to a regulating valve 42. The adjustment of the pivot angle takes place on actuation of the proportional valve 42 by supply of fluid from a fluid source P or discharge of fluid to a tank T. The proportional valve 42 is activated by an electrical signal which is generated in a control means 43 to which predetermined input quantities are supplied, in particular a desired value for the speed of rotation, and the actual value of the speed occurring at the shaft 1 of the machine 2R,2 and furthermore possibly also the impressed pressure in the HP line 35P, the torque occurring at the shaft 1M, the angle of rotation measured at the shaft 1 and other values necessary for the desired control.

Between the valve 42 and the actuator 15 a switch-over valve 14 is provided. In the illustrated position of the switchover valve 14 the constant pressure source 3 is connected to the fluid path 37, thereby actuating the actuator 15 in such a manner that it adjusts the machine in the sense of the maximum pivot angle. In the switched-over position (not illustrated) the constant pressure source 3 is shut off and the fluid paths 37, 39 and 38, 40 are connected to each other to actuate the actuator 15 via the valve 42.

Also connected to the control pressure line 16 is a valve 17 which is held by the control pressure in the line 16 in the closure position. If the control pressure breaks down the valve 17 thus opens. Provided downstream of the valve 17 is a magnetic valve 18 which in the currentless state is in the through position so that the control pressure line 16 remains connected to the tank T as long as the magnetic valve 18 is currentless. In the control means 43 a circuit can be provided which ensures that the magnet 30 of the magnetic valve 18 can be energized only when all electrical components are found to be in working order by means such as an electronic monitoring means, not illustrated. The magnetic valve 18 can then be switched to the shutoff position, whereupon control pressure can again be built up in the line 16 and the secondarily controlled drive put into operation.

The mode of operation of the safety arrangement illustrated is as follows: in the fault-free state the valves 6, 7 and 18 are closed. As a result control pressure can be built up in the control pressure line 16 which is connected via a throttle 19 to the HP line 35. Consequently, the pistons 22 and 23 are lifted against the force of the springs 20 and 21 in the two shutoff valves 8 and 11 and the connection thus established between the constant pressure source 3 via the HP line 35 to the machine 2 and from the machine 2 via the LP line 36 to the tank.

Furthermore, the switchover valve 14 is switched by the pressure in the line 26, which is connected via a throttle 27 likewise to the HP line 35, out of the position illustrated so that the HP line 35 is shut off from the line 37 by the valve piston 29, which has the collars illustrated, and the lines 37, 39 and 38, 40 respectively are connected together.

In this switching state the actuator is now actuated and the setting of the pivot angle of the machine 2 effected via the proportional valve 42 activated by the control means 43.

If for example proceeding from the normal case outlined the tachogenerator (not shown) detecting the actual value of the speed of the shaft 1 fails the control means 43 receives the signal that the speed is too small. The control means will thus generate an output signal with which the pivot angle of the machine 2 is increased up to the maximum value to increase the speed. The motor 2 therefore accelerates with the limit value. On exceeding the permissible acceleration value the pickup 4 responds and switches the valve 6 to the through position. As a result, due to the pressure drop at the throttle 19, the control pressure in the line 16 breaks down. Consequently, the pistons 22 and 23 are abruptly closed by the springs 20 and 21 provided with high biasing force and the motor 2 thus shut off from the inlet and outlet. In the shutoff position of the piston 20 the line 26 is connected via the control edges 24 and 25 to the tank T so that the pressure in the line 26 also breaks down due to the pressure drop at the throttle 27. The spring 28 consequently pushes the piston 29 of the switchover valve 14 to the left and the actuator 15 is connected via the line 37 to the HP line 35, the motor 2 thereby being adjusted to the maximum pivot angle. The motor 2 is thus able to apply a maximum restraining moment and for example in the case of a crane can hold the load.

To avoid a sudden retardation of the motor 2 or the load suspended thereon the pressure-limiting valve 12 is set so that via said valve fluid is discharged by the machine 2 now operating as pump and sucked via the after-suction valve 10 from the tank. By selection of the setting of the valve 12 the breaking moment can be defined. The machine operating as pump driven by the load can thus be gradually retarded until it is stationary.

The pressure relief in the control line 16 has also switched the valve 17 to the through position. The magnetic valve 18 is likewise in the through position. Thus, no control pressure can be built up in the line 16 and the drive cannot be put into operation again. The magnetic valve 18 cannot now be switched to the shutoff position until all the electrical components have been checked and are in working order. As soon as a control pressure is built up in the line 16 the valve 17 is closed by the control pressure and the magnetic valve 18 returns to the currentless state.

I claim:

1. Safety arrangement for a hydrostatic machine of variable absorption or displacement volume connected to a pressure network having a pressure source, adjustment means for the pivot angle of said machine, a regulating valve for selectively connected said adjustment means selectively to a fluid source and a tank, said regulating valve being operable by an electrical signal generated in a control means in response to a plurality of input quantities, characterized in that in the hydraulic connector between said hydrostatic machine and said pressure source a normally open shutoff valve is provided and means for closing said shutoff valve in response to an excessive speed condition of said hydrostatic machine.

2. Safety arrangement according to claim 1, characterized in that opening of the shutoff valve is effected by a control pressure and closing is effected by spring force.

3. Safety arrangement according to claim 2, characterized in that a line is provided for carrying the control pressure for the shutoff valve, wherein said line can be relieved of pressure for effectively closing the shutoff valve in response to the excessive speed condition.

4. Safety arrangement according to claim 3, characterized in that two valves are provided in series for relieving pressure in the line carrying the control pressure, wherein one valve is held by the control pressure in a shutoff position and the second valve arranged downstream is electrically operable, said second valve being switchable to the shutoff position only in the presence of normal conditions.

5. Safety arrangement according to claim 1, characterized in that in the fluid path to the actuator a switchover valve is provided which is moveable to a working position for operating said actuator to maximize the pivot angle of the machine upon the closure of the shutoff valve.

6. Safety arrangement according to claim 5, characterized in that the switchover valve is held by the control pressure in a shutoff position and on closure of the shutoff valve a control pressure line for the switchover valve is relieved off pressure so that the switchover valve is moveable into the working position.

7. Safety arrangement according to claim 5 characterized in that the switchover valve is arranged between a regulating valve and the actuator and that on response of the switchover valve in the closure position of the shutoff valve the fluid paths to the regulating valve are shut off.

8. Safety arrangement according to claim 1 characterized in that a second shutoff valve is positioned in the LP line of the machine, said second shutoff valve being opened by the control pressure and closed by a spring.

9. Safety arrangement according to claim 8 wherein the line for the shutoff valves carrying the control pressure is connected via a throttle to the HP line.

10. Safety arrangement according to claim 1, characterized in that in the line section between the machine and the shutoff valve a pressure-limiting valve and an after-suction valve are disposed.

11. Safety arrangement according to claim 1 wherein the excessive speed condition constitutes a speed in excess of a predetermined speed.

12. Safety arrangement according to claim 1 wherein the excessive speed condition comprises acceleration greater than a predetermined acceleration.

13. Safety arrangement according to claim 12 wherein the shutoff valve is also moved to its closed position in response to the operation of the machine at a speed greater than a predetermined speed.

* * * * *